US007747475B1

(12) United States Patent
Bowman et al.

(10) Patent No.: US 7,747,475 B1
(45) Date of Patent: Jun. 29, 2010

(54) INTELLIGENT AND FIRM CURRENCY CONVERSION

(75) Inventors: Mary Kay Bowman, Seattle, WA (US); Eileen Tracey Quenin, Seattle, WA (US); Thomas L. Kovarik, Woodinville, WA (US); Srinivas K. Rao, Issaquah, WA (US); Rohit Jain, Mercer Island, WA (US); Nitesh Goyal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 2 days.

(21) Appl. No.: 12/205,724

(22) Filed: Sep. 5, 2008

(51) Int. Cl.
*G07F 1/12* (2006.01)

(52) U.S. Cl. .............................. 705/26; 705/27; 705/35; 705/39; 705/40

(58) Field of Classification Search .................. 705/26, 705/27, 35, 39, 40
See application file for complete search history.

(56) References Cited

U.S. PATENT DOCUMENTS

| 5,787,402 | A * | 7/1998 | Potter et al. .................... 705/37 |
| 6,199,046 | B1 | 3/2001 | Heinzle et al. |
| 6,829,590 | B1 * | 12/2004 | Greener et al. ................. 705/38 |
| 6,892,184 | B1 | 5/2005 | Komem et al. |
| 7,024,383 | B1 * | 4/2006 | Mancini et al. ............... 705/35 |
| 2002/0062278 | A1 * | 5/2002 | Ingram et al. .................. 705/39 |
| 2002/0161707 | A1 * | 10/2002 | Cole et al. ..................... 705/42 |
| 2002/0174025 | A1 * | 11/2002 | Hind et al. ..................... 705/26 |
| 2004/0199442 | A1 * | 10/2004 | Haberle ........................ 705/35 |
| 2006/0229982 | A1 * | 10/2006 | Hahn-Carlson et al. ....... 705/40 |
| 2008/0147516 | A1 * | 6/2008 | Rousso et al. ................. 705/27 |

OTHER PUBLICATIONS drugstore.com Ships First International Order; Partnership with Comerxia Provides Shipping to 35 Countries; Business Editors. Business Wire. New York: Jul. 22, 2003. p. 1.*

* cited by examiner

*Primary Examiner*—James B Dunham
*Assistant Examiner*—Courtney Stopp
(74) *Attorney, Agent, or Firm*—Lee & Hayes, PLLC

(57) ABSTRACT

This disclosure pertains to techniques for intelligent selection of a currency preference for a user and conversion of monetary values to the preferred currency for transactions entered into by the user. The conversion is performed using a firm exchange rate that is derived from a market exchange rate, but guaranteed for a period of time during which the transaction is anticipated to be completed.

14 Claims, 7 Drawing Sheets

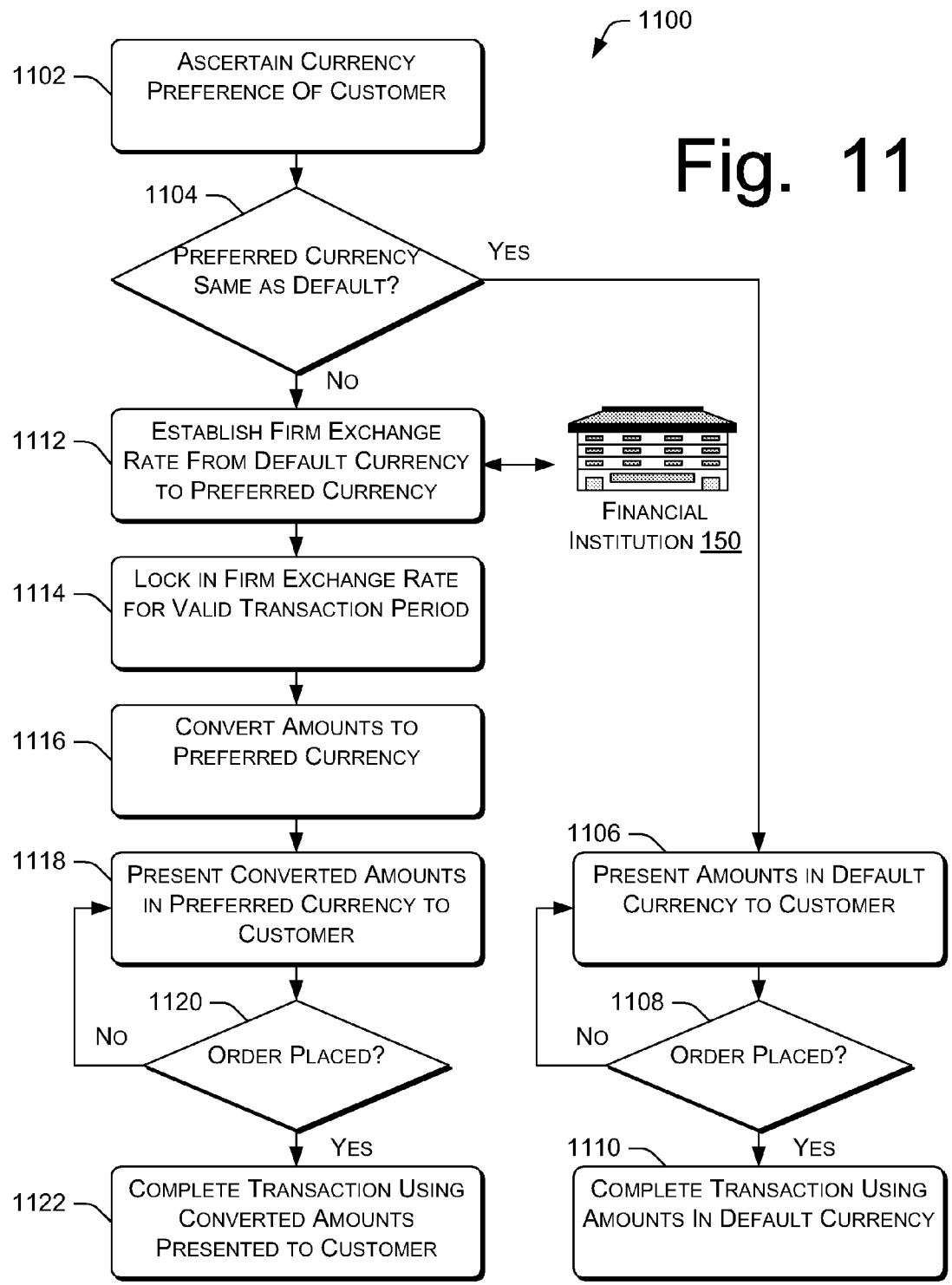

INTELLIGENT AND FIRM CURRENCY CONVERSION

BACKGROUND

Electronic commerce continues to expand rapidly, with a vast and growing population of people going online to shop and purchase goods and services. Within that population are customers who reside in different countries from the merchant. These "cross-border" customers often face several inconveniences and cost issues while shopping cross border, such as increased shipping cost, increased transportation/customs time and confusion, and additional costs related to paying in their non-local currency. For instance, customers who have foreign denominated credit or debit cards, or other payment methods, often have to convert mentally from the merchant's currency to their own currency prior to making any purchase decisions. However, currency exchange rates are not static, but are in movement throughout each trading day. So, the exchange rate commonly fluctuates while the customer is evaluating a purchase and may continue to fluctuate during the purchase process. The customer may not know the true cost of the transaction until receiving a credit/debit card or banking statement from their financial institution.

Also, cross-border transactions typically lack an additional level of transparency because financial institutions generally charge an additional fee for converting the currency for the customer after an online purchase is made. Thus, when making a purchase online, customers are usually uncertain as to the exact conversion rate, any surcharges applied by a credit card company, and any surcharges applied by the customer's bank.

Accordingly, there is a need to improve the cross-border shopping and transaction experience in electronic commerce.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 11 is a flow diagram of a process for intelligently converting and offering a firm currency exchange rate to complete an online transaction.

DETAILED DESCRIPTION

This disclosure is directed to techniques for improving cross-border shopping and transaction experiences in electronic commerce. The techniques involve intelligent selection of currency to be presented to a user when that user visits an electronic merchant site, rather than using the site's default currency. This selection may be based on many different criteria, such as user profiles, user behavior on the site, purchase history, point of access to the network, and so forth. For instance, suppose a European customer is visiting a merchant site hosted in the United States that denominates its products and/or services in U.S. dollars. When that customer decides to make a purchase, the monetary amounts involved in the transaction are converted and presented in a currency preferred by the customer, such as Euros.

More than just converting from a default currency to a preferred currency, however, the techniques described herein establish a firm currency exchange rate for a predetermined transaction period. For instance, the transaction period may be a period of days or weeks, with an example timeframe for maintaining the firm currency exchange rate being more than 24 hours and less than 14 days. In this manner, the converted amounts presented to the customer reflect the actual amounts that the customer will pay to complete the transaction. Any exchange rate fluctuations and timing risks are assumed by the merchant or service provider, rather than the customer. Thus, when making a purchase online, the customer can be certain as to precise conversion rate, inclusive of any shipping or delivery charges. Further, the techniques described herein can help reduce or eliminate exposure for the customer of any surcharges applied by a financial institution (e.g., credit card company, debit card company, etc.) or by the customer's bank because the user is being billed in his/her home currency. Since the transaction is finalized in the customer's home currency, there should be no further conversion by the financial institution or bank.

Further, the firm currency exchange rate may be used in the event the user returns the purchased item or service and requests a refund. The firm currency exchange rate may be maintained for purposes of possible refund for a fixed duration (e.g., 30, 60, or 90 days) or indefinitely.

The currency exchange techniques may be implemented in a number of ways. For purposes of discussion and illustration, the techniques are described in the context of an e-commerce environment. One example implementation is provided with reference to the following figures, as described below in more detail. However, the techniques may be implemented in other contexts to provide converted and temporally firm values such as online banking, financial transactions like stock and bond purchases, bill payment, advertising offers, and so on.

Example Environment and System Architecture

Figure 1:
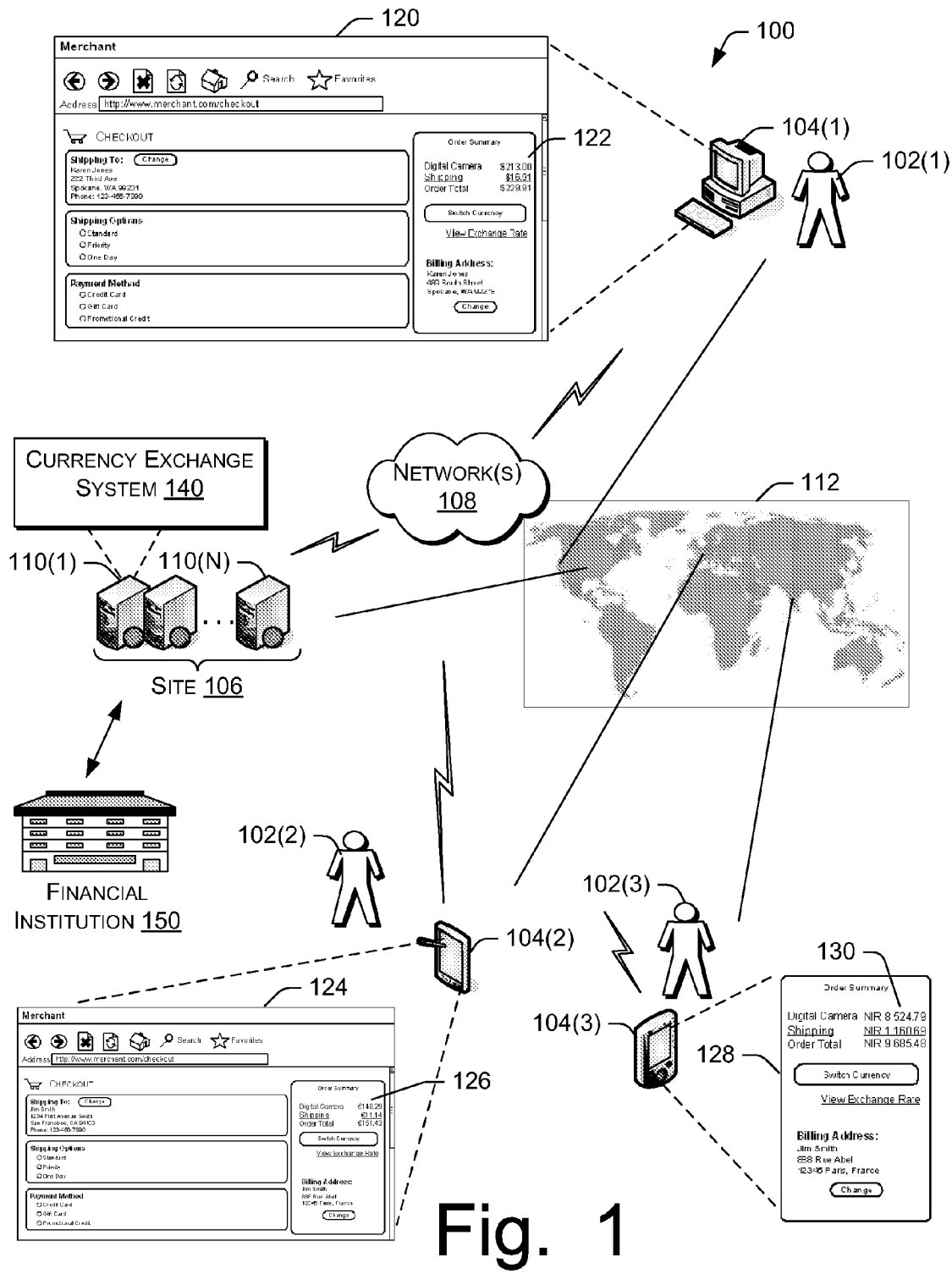
FIG. 1 illustrates an example architecture for intelligent and firm currency conversion.

FIG. 1 illustrates an example architecture 100 in which intelligent and firm currency conversion may be implemented. In architecture 100, three representative users 102(1), 102(2), and 102(3) are illustrated, with each employing a user computing device 104(1), 104(2), and 104(3) to access a site 106 via a network 108. The network 108 is representative of any one or combination of multiple different types of networks, such as cable networks, the Internet, and wireless networks.

The user computing devices 104(1)-(3) may be implemented as any number of computing devices (mobile or stationary) that can access the site 106, including, for example, a personal computer (e.g., 104(1)), a laptop computer (e.g., tablet computer 104(2)), a portable digital assistant (PDA) (e.g., 104(3)), a cell phone, a set-top box, a game console, and so forth. Each user computing device 104(1)-(3) is equipped with one or more processors and memory to store applications and data. An application, such as browser, running on each of the devices facilitates access to the site 106 over the network 108.

The site 106 is representative of any number of sites accessible over a network, such as websites for e-commerce, news and information, financial services, banking services, search, entertainment, and so forth. Additionally, the site may be representative of proprietary sites on proprietary networks other than the Internet and public web. The site 106 is hosted on one or more servers 110(1), . . . , 110(N) having processing and storage capabilities. In one implementation, the servers might be arranged in a cluster or as a server farm, although other server architectures may also be used to host the site.

The site 106 is capable of handling requests from many users and serving, in response, content that can be rendered at the user computing devices 104(1)-(3) for viewing by the users 102(1)-(3). The site 106 can be visited by users throughout the world. In this illustration, the site 106 is located in the United States, as demonstrated by reference to a global map 112. One user 102(1) is also located in the United States, whereas a second user 102(2) is located in Europe, and a third user 102(3) resides in India. As part of the content that can be served to the users, the site 106 provides monetary amounts in one or more currencies. Monetary values may appear in the content for any number of reasons. For instance, the monetary values may be prices for items being marketed on a merchant website, prices for services or reservations on a service website, values offered in advertisements, or values presented inline in a news article or other types of content. In the example of FIG. 1, the monetary amounts are for items being purchased on an e-commerce merchant site.

The site 106 presents monetary amounts to visiting users in a default currency. In the example of FIG. 1, the site 106 is hosted in the US and hence presents monetary values in US dollars as the default currency. However, if discernable, the site 106 provides monetary amounts in a currency that is relevant to, and preferred by, each individual user. In FIG. 1, for example, suppose the site 106 is able to discern that the US-based user 102(1) prefers a US currency denomination, European-based user 102(2) prefers seeing values in Euros, and the Indian-based user 102(3) prefers Rupees. In this case, the site 106 serves pages to the computing device 104(1) of US-based user 102(1) that contain prices in US dollars. A browser user interface (UI) 120 renders the page with prices 122 presented in US dollars. In contrast, content served to the computing device 104(2) of European-based user 102(2) contains monetary values in Euros since this is the preference of the user. As shown, a browser UI 124 renders a page having prices 126 provided in Euros. Finally, content provided to the mobile computing device 104(3) of Indian-based user 102(3) is rendered in a UI 128. Monetary values 130 are denominated in Rupees.

A currency exchange system 140 is shown residing at the site 106 and executing on one or more servers 110(1)-(N). In other implementations, however, the currency exchange system 140 may reside on one or more other servers at the same or different location, but may still be accessible by the site 106. The currency exchange system 140 intelligently assesses requests from the user computing devices 104(1)-(3) to ascertain which currency might be preferred by each of the users. For instance, the currency exchange system 140 may evaluate the user's point of access to the network, a user's profile maintained at the site 106, information entered by the user (such as address or preferences) during a session, user behavior, purchase history, IP or device address, and so forth. Any number of these factors or pieces of evidence may be evaluated to ascertain a user's currency preference. One or more various algorithms may be implemented to weight the factors and/or identify trends in the factors over time. Further, the algorithms may be configurable or personalized for individual users or groups of users. Moreover, the factors and algorithms may be dynamically altered or adjusted over time. For discussion purposes, assume that the currency exchange system 140 has used one or more of these pieces of evidence to ascertain that the user 102(1) prefers values denominated in US dollars, the user 102(2) prefers Euros, and the user 102(3) prefers Rupees.

If the currency preference differs from the default currency, the currency exchange system 140 establishes a currency exchange rate to convert the monetary amounts. In the example of FIG. 1, the currency exchange system 140 establishes exchange rates to convert prices from the default currency of US dollars to Euros for European-based user 102(2) and to Rupees for India-based user 102(3). The exchange rates established by the currency exchange system 140 are firm for a period of time. In this manner, the prices or monetary amounts converted using the exchange rates and presented to the users are also firm for the time period. Thus, the Euro-denominated amounts 126 presented in UI 124 are firm for a time period and the Rupee-denominated amounts 130 presented in UI 128 are firm for a time period (which may be the same or different from the time period for conversion to Euros). If the user decides to enter into a transaction involving the converted amounts, the user is assured that the firm exchange rate is true and guaranteed for use in determining the amounts that will ultimately be billed to the user.

In one implementation, the currency exchange system 140 interacts with an independent financial institution 150 to obtain market exchange rates. The financial institution may be a bank, insurance company, or any type of institution that trades currency and/or offers terms in the exchange of currency. From these terms, the currency exchange system 140 establishes the firm currency exchange rate that the site 106 (or an independent operator such as a service provider operating the currency exchange system 140 or third-party underwriting entity) is willing to guarantee for the time period. Depending upon circumstances and different use scenarios, the firm currency exchange rate may either be the same as, or different than, the market rate offered by the financial situation 150. Factors that play into establishment of the firm rate are the amount of risk the site 106 (or independent operator) is willing to assume, recent history of rate fluctuations, and the duration of the time period for which the firm rate is being guaranteed. In some scenarios, the firm currency exchange rate may be approximately the same as the rate offered by the financial institution 150, particularly if the period of time for which the firm rate is offered is small. However, in other scenarios, the firm currency exchange rate may be different to account for increased risk that the site 106 (or independent operator) is willing to assume.

The time period for which the site 106 is willing to offer the firm exchange rate may be set according to any number of factors. In the environment of e-commerce, for example, the time period may be based in part on a delivery timeframe in which goods are to be delivered. To illustrate this point, suppose that the European-based user 102(2) purchases an item online that is scheduled for delivery in seven days. The currency exchange system 140 might then establish a firm exchange rate that is higher than the market rate currently being offered by the financial institution 150 to cover the increased risk of guaranteeing this rate for seven days. The benefit to the user, however, is that he/she knows the exact amount, in Euros, that will be billed for this purchase.

In other implementations, the time period may be based on various types of transactions. For example, a transaction involving large ticket items or large expenditures, the exchange rates may be relatively de minimus and hence the site 106 is willing to assume the currency rate fluctuations and guarantee the exchange rate for a specified timeframe in order to complete the transaction. Further, in still other implementations, the time period may be a configurable parameter set by the system administrator. In one particular implementation, the time period is at least one day (24 hours), but less than fourteen days.

When the architecture 100 of FIG. 1 is implemented in the context of e-commerce, the users 102(1)-(3) may shop at the site 106 and browse through different items for sale. The prices of these items may be denominated in the default currency (e.g., US dollars), or if ascertainable by the currency exchange system 140, denominated in the currency preferred by the users. In the latter case, the currency exchange system 140 establishes a firm exchange rate for each currency conversion, and then converts the monetary amounts to the preferred currency using the firm exchange rate. If one of the users decides to purchase an item, the firm exchange rate will be used in the final conversion of amounts to be paid by the user to complete the transaction. Exchange rate fluctuations and timing risks are assumed by the merchant site 106, rather than the user. Thus, when making a purchase online, the user can be certain of the conversion rate being used for the pricing and any shipping or delivery charges as long as the transaction is finalized within the prescribed transaction period.

Currency Exchange System

Figure 2:
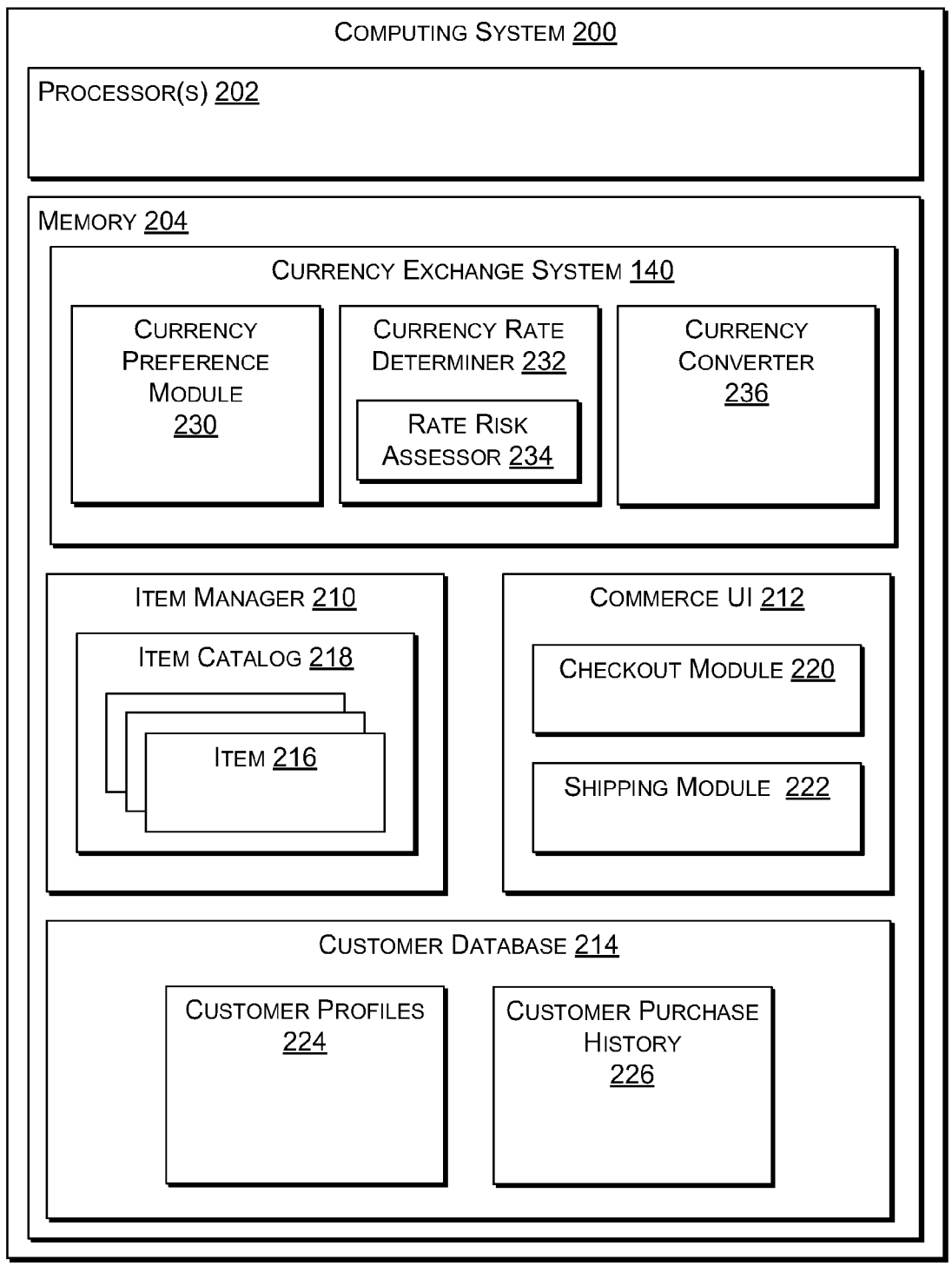
FIG. 2 is a block diagram of a host site and illustrates selected modules employed in intelligent currency conversion.

FIG. 2 illustrates on example implementation of the currency exchange system 140 configured as a set of software modules installed on a computing system 200. The computing system 200 may consist of one or more computers (such as servers 110(1)-(N) in FIG. 1), and has processing capabilities and memory suitable to store and execute computer-executable instructions. In this example, the computing system 200 has one or more processors 202 and memory 204. The memory 204 may include volatile and nonvolatile memory, removable and non-removable media implemented in any type or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

In the illustrated implementation, the currency exchange system 140, an item manager 210, and a commerce user interface (UI) 212 are all shown implemented as software or computer-executable instructions stored in the memory 204 and executed by the one or more processors 202. A customer database 214 is also maintained in the memory 204 to store customer data for use by the currency exchange system 140 and commerce UI 212.

The item manager 210 facilitates access to and management of item records 216 in an item catalog 218. The item manager 210 allows site operators to add or remove items to the item catalog 218, and generally maintain control of the items offered on the site 106. Each item record 216 contains information about an associated item being offered for sale on the site 106. An item may be anything that the merchant wishes to offer for sale (e.g., purchase, rental, download, etc.), or anything that others using the merchant's site wish to offer for sale. An item can include a product, a service, or some other type of sellable unit. For products such as digital cameras, for example, the item record may contain a description, images of the product, manufacturer name, pricing, shipping information, and so forth. For other types of items, the item record may contain different information appropriate for those items. The collection of item records 216 stored in the item catalog database 218 are accessible, directly or indirectly, by the commerce UI 212 to construct pages to serve to users. When a user requests information on an item from the site 106, the item information is retrieved from the item catalog 218 and served as a page of content containing the information to the requesting user computing device. The database 218 may therefore contain static pages that are pre-generated and stored prior to such requests, or alternatively store data that is used to populate dynamic web pages that are generated in response to such requests.

The commerce UI 212 provides a graphical user interface for an e-commerce site. The users 102(1)-(3) may interact with the commerce UI 212 via browsers or other rendering applications running on their respective computing devices 104(1)-(3) to shop for various items offered by the site 106. The commerce UI 212 presents items for sale through interactive pages of content served to the user computing devices 104. Through these pages, the user may browse through items, search for particular items, and obtain more specific information about any items of interest. Any prices of items displayed on pages served by the commerce UI 212 may be presented in the site's default currency or converted to a currency preferred by the user via the currency exchange system 140. Examples of these pages are described below with reference to FIGS. 3-10.

The commerce UI 212 includes a checkout module 220 and a shipping module 222. The checkout module 220 facilitates purchase of one or more items. As the user identifies items to purchase, those items may be added to an electronic shopping cart. When the user is finished shopping, the user can checkout and purchase the items in the shopping cart. The checkout module 220 allows the user to decide a form of payment, choose a shipping option, and provide information to complete the sales transaction. The shipping module 222 maintains the various shipping options available to the users, as well as pricing for those options. The shipping options and pricing may vary for any number of reasons, such as where the user resides (e.g., in the same country as the site operator or in different countries), special times of the year (e.g., near holidays), availability of shipping options, and so forth.

The customer database 214 maintains information on users who have interacted with the site before and perhaps have purchased one or more items in the past. The customer database 214 stores customer profiles 224 containing user data such as names, shipping addresses, billing addresses, billing preferences, shipping addresses, shipping preferences, demographical information, and so forth. The customer profiles 224 may also specify the user's preferred currency. The customer database 214 may further track and retain a customer's purchase history 226 as individual users browse the e-commerce site and purchase items. The customer's purchase history 226 may track such data as pages visited, items reviewed, time spent reviewing items, what items were purchased, associations among items purchased, and so forth.

The currency exchange system 140 facilitates intelligent and firm currency conversion. The currency exchange system 140 includes a currency preference module 230 that ascertains a currency preference of the user. The currency preference module 230 may use any number of factors to discern the currency preference. For instance, the currency preference module 230 may access the customer profiles 224 to determine whether the user has specified a preference. Apart from an explicit preference, the currency preference module 230 can infer a preference from shipping or billing addresses, residence, or any other evidence maintained in the customer profiles 224. Alternatively, the currency preference module 230 may glean a user's preferred currency from past user behavior and/or data in the customer purchase history 226. For instance, the purchase history may reveal that this particular user purchased the last three items using Euros. Even if the user is logged in from a location in the United States, the currency preference module 230 may select Euros as the preferred currency, rather than US dollars.

A currency rate determiner 232 is also included in the currency exchange system 140 to establish a firm currency exchange rate to convert monetary values from a default currency used by the site to the currency preferred by the user. The currency rate determiner 232 interacts with a financial institution (e.g., institution 150 of FIG. 1) to obtain a market exchange rate. The currency rate determiner 232 may obtain market exchange rates on a frequent or routine basis (e.g., daily, hourly, etc.). Alternatively, the currency rate determiner 232 may fetch a market exchange rate on demand. The currency rate determiner 232 includes a rate risk assessor 234 that evaluates the terms and market conditions of the transaction, and attempts to assign a risk level to the transaction. Factors considered by the risk assessor include recent market fluctuations, currency trends, type of transaction, total value of transaction, time to completion of transaction, and delivery timeframe. Generally, some of these factors indicate a timeframe within which the user is expected to be billed.

In an e-commerce implementation, the rate risk assessor 234 retrieves the sale terms and shipping information from the checkout module 220 and the shipping module 222 of the commerce UI 212. The rate risk assessor 234 evaluates the estimated delivery timeframe for this transaction because this may be used a proxy of when the user is expected to be charged (i.e., billing occurs upon shipment). The assessor 234 generates the risk level based in part on the delivery timeframe. If the delivery timeframe is shorter (e.g., three days or less), the assessor 234 might set a lower risk level and the currency rate determiner 232 may establish a firm exchange rate that is close to that of the market rate. However, if the delivery timeframe is longer (e.g., greater than four days), the assessor may set a higher risk level, leading the currency rate determiner 232 to establish a firm exchange rate that is materially different than the market rate to cover increased risks of rate fluctuations and timing. Moreover, if the delivery timeframe is unknown or undeterminable (e.g., items on backorder, items that can be pre-ordered, or any item that will ship outside of a maximum delivery timeframe such as fourteen days), the rate risk assessor 234 may determine that there is too much risk assumption to guarantee the exchange rate. This, in turn, informs the currency rate determiner 232 that the site 106 may not assume the currency rate risk and hence may notify the user that the rates provided are only estimates and not firm.

It is noted that, in other implementations of an e-commerce setting, the rate risk assessor 234 may use other factors in addition to, or instead of, time. For instance, the risk assessor may look at the type or class of goods/services being sold as a factor for determining how much risk it is willing to assume. The cost of goods/services may be another factor for consideration.

It is further noted that, where the currency exchange system 140 provides converted monetary values to pages other than checkout (e.g., shopping pages), the time period for guaranteeing the exchange rate may be much shorter. For instance, the exchange rate used to generate the values being presented to the user may only be firm during the session with the user. Thus, example determinations of a session ending could include, among other things, a user: leaving or logging out of the site, not interacting with the site for a period of time, passing a time boundary (e.g. midnight or some other arbitrary time), or passing a threshold duration of time since the user first or last interacted with the site. In such an embodiment, once the session has ended, the rate is potentially no longer valid and a new exchange rate is calculated. Further, for implementations where the currency exchange system 140 supplies converted values for applications other than e-commerce, the time period may vary from application to application and is configurable by an administrator depending, in part, on the risk level that the site operator is willing to accept.

Based on this risk level, the currency rate determiner 232 modifies the market exchange rate to establish a firm exchange rate that the currency exchange system 140 is willing to guarantee for a predefined period of time. A currency converter 236 employs the firm exchange rate to convert monetary values from a default currency to the preferred currency using a firm exchange rate. These converted values are then supplied to the commerce UI 212 and inserted into pages served to the user computing devices. Thus, the prices are exhibited in the user's preferred currency. Further, the prices are guaranteed for a period of time, allowing the user to know the true cost of purchasing the item.

Although this example is described in an e-commerce environment, the site 106 may be operated in other contexts. For instance, the site 106 may be a news and information site that includes monetary values in the article, or contain advertisements with prices. In this context, the currency exchange system 140 may be called to provide monetary values denominated in a currency preferred by the user. In the case of advertisements, the converted prices may be considered firm prices that the user would be expected to pay if the user decided to act upon the advertisement and purchase the item. In addition, the "site" is not limited to web sites. For example, the disclosed embodiments could be implemented in a set-top box environment (e.g. cable head-end environment, a server for a personal video recorder (PVR) system, etc.), a music purchase server/client system, among many other client-server based systems.

Although illustrated as residing on a common computing system 200, it is noted that the currency exchange system 140 may be maintained on a computing system independent of the item manager 210, commerce UI 212, and customer database 214. In certain embodiments, the currency exchange system 140, item manager 210, commerce UI 212, and customer database 214 are maintained on separate computing systems that are interconnected through a network, such as a private network or a public network like the Internet. Moreover, the currency exchange system 140 may be operated independently of one or more of these other service components—item manager 210, commerce UI 212, and customer database 214—of an e-commerce site such that the currency exchange system 140 functions as an independent service available to e-commerce sites and other content sites that wish to offer converted currencies at firm exchange rates for specified periods of time. For example, the currency exchange system 140 can be operated as a web service having a programmatic interface (e.g. API) for interacting with the service to introduce any information needed for the currency exchange system 140 to make its decisions. In some embodiments, entities using the service may pass in information about the purchase (e.g. time to ship information, pricing information about purchased items, etc.) to determine the exchange rate. Furthermore, entities using the service may pass in user information (e.g. billing addresses, past purchase history, etc.) in order for the currency exchange system 140 to determine the currency preference of the user. Likewise, the programmatic interface may return the preferred currency of the user, the exchange rate, and/or the final price of the prospective purchase in the user's preferred currency. The programmatic interface can also be used to obtain market exchange rate information from financial institution 150.

Example User Interfaces

FIGS. 3-10 illustrate several screen renderings of an e-commerce UI that may be served, for example, by the site 106 in architecture 100 of FIG. 1. For purposes of discussion and illustration, the screen renderings are described in the context of a merchant website (www.merchant.com) that sells digital cameras, among other possible items.

Figure 3:
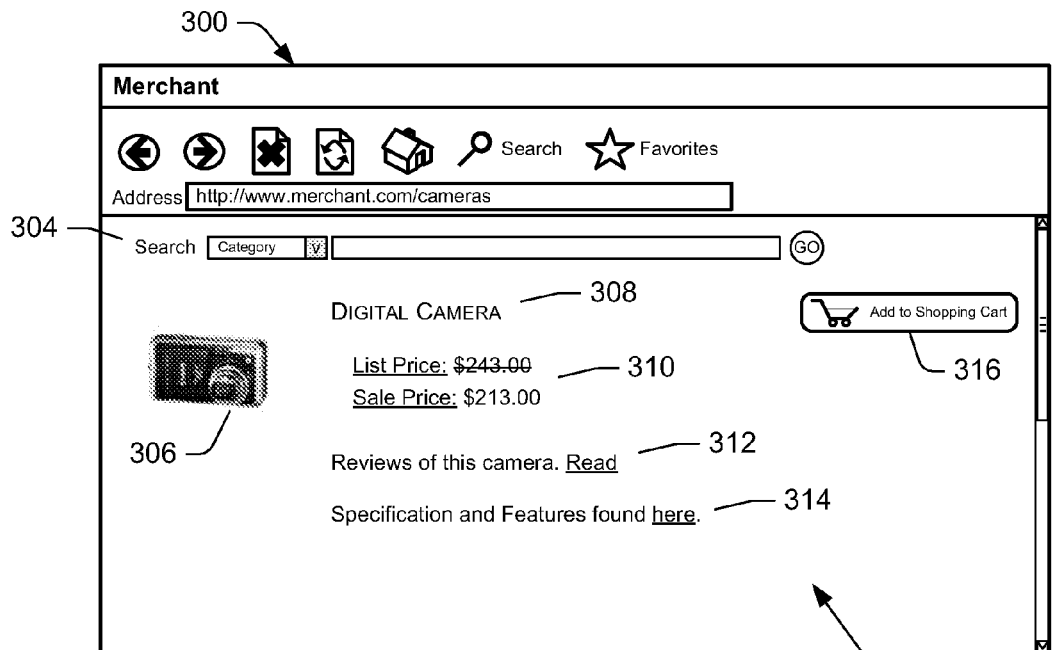
FIG. 3 illustrates a screen rendering of an exemplary shopping page for an item offered by an electronic commerce merchant. The shopping page presents prices in a merchant default currency.

FIG. 3 shows a first rendering 300 of an exemplary shopping page 302 for an item offered by an electronic merchant. The shopping page 302 is illustrated as being rendered by a browser program having common navigational controls. The page 302 has a search interface 304 to facilitate search of products offered by the merchant site. In this illustration, the shopping page 302 contains item information pertaining to a digital camera, although other types of items may be depicted. The information includes a thumbnail image 306 of the camera, an item title 308 (e.g., "Digital Camera"), list and sale prices 310, a link 312 to product reviews of the digital camera, and a link 314 to additional features and attributes of the digital camera. The prices are presented in the merchant's default currency, which is US dollars in this example. Of particular interest is the sale price of $213.00 for this digital camera. The shopping page 302 further includes an actionable control or button 316, labeled "Add to Shopping Cart", which enables the user to add the digital camera to a shopping cart by actuating the control (e.g., by clicking on the button with a pointer).

Figure 4:
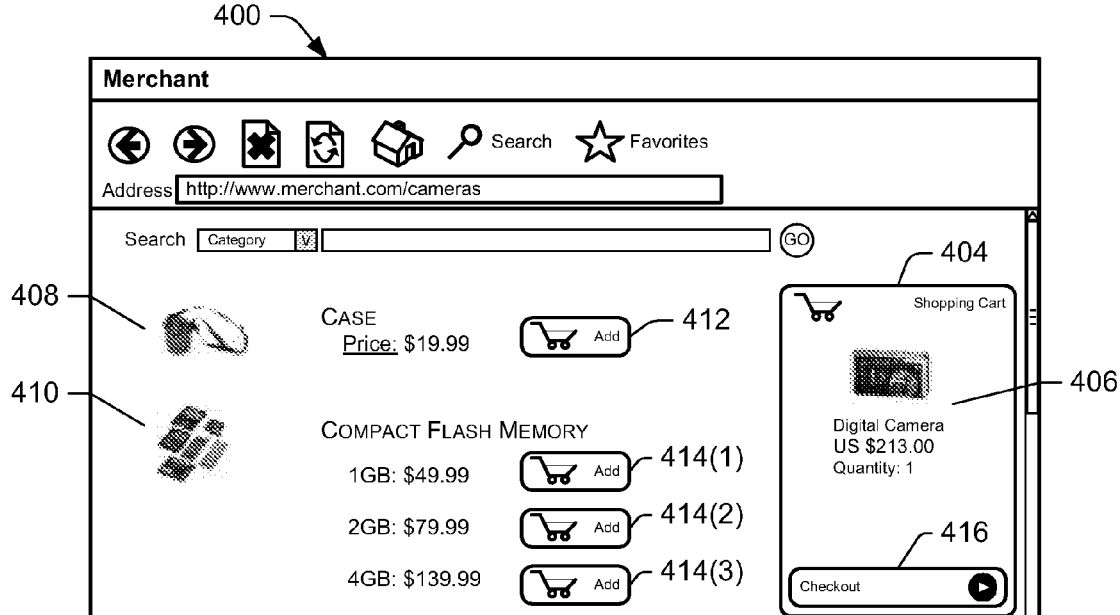
FIG. 4 illustrates a screen rendering of an exemplary page presented after a customer elects to add an item to a shopping cart when interacting with the shopping page of FIG. 3.

FIG. 4 shows a rendering 400 of an exemplary page 402 presented after a user elects to add the digital camera to an electronic shopping cart by actuating the button 316 in the shopping page 302 of FIG. 3. The page 402 contains an electronic shopping cart 404 with the digital camera item 406 to convey to the user that this item is ready for purchase. The shopping cart 404 also shows the price of $213.00 for the digital camera. At this point, the user may continue shopping for other items on the site. The user may search for new items or, in this example, the site 106 may automatically populate the page 402 with accessory items that the user might be interested in purchasing, given that the user just added a digital camera to the shopping cart. These items include a camera case 408 and flash memory 410, and the prices for these items are displayed in US dollars. An actionable button 412 allows the user to add a camera case to the shopping cart 404, and actionable buttons 414(1), 414(2), and 414(3) enable addition of various memory products to the shopping cart 404. Once the user has added all of the items of interest, the user may proceed to "checkout" to purchase the items by acting on a control button 416, labeled "checkout".

Figure 5:
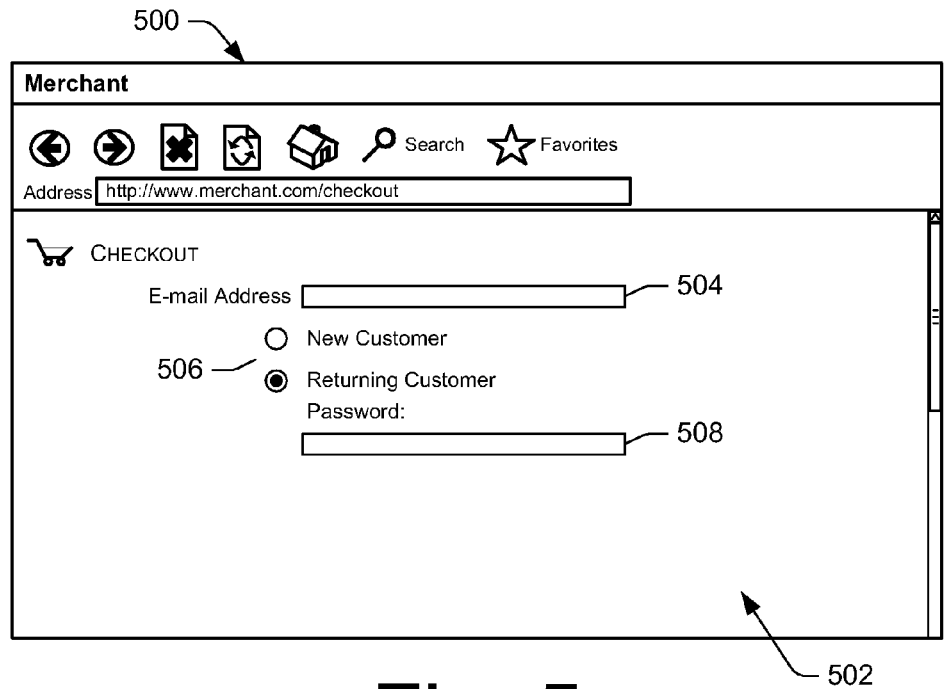
FIG. 5 illustrates a screen rendering of an exemplary login page encountered when the customer elects to checkout with the item in the shopping cart of FIG. 4.

FIG. 5 shows rendering 500 of an exemplary login page 502 of a checkout process encountered when the customer elects to checkout by actuating the "checkout" control 416 in the shopping cart 404 of FIG. 4. In the illustrated implementation, the checkout login page 502 has an email entry field 504 in which a user may enter his or her email, and selectable options 506 to designate whether the user is a new customer or a returning customer. If a returning customer, a password entry field 508 allows the user to enter a password. If the returning customer successfully logs in, the currency exchange system 140 may access the user profile 224 and/or customer history 226 in an effort to ascertain whether the user has stipulated a currency preference or whether a currency preference can be inferred from user behavior, shipping addresses, mailing addresses, or other facts about the user.

For purposes of continuing discussion, suppose that the user is a returning customer who has a preference for seeing monetary values denominated in Euros. The user may explicitly state this preference, or the currency exchange system 140 may infer this preference from the user profile or user behavior. Following a successful customer logon, the currency exchange system 140 can access the user profile and/or purchase histories to ascertain the preferred currency of Euros.

Figure 6:
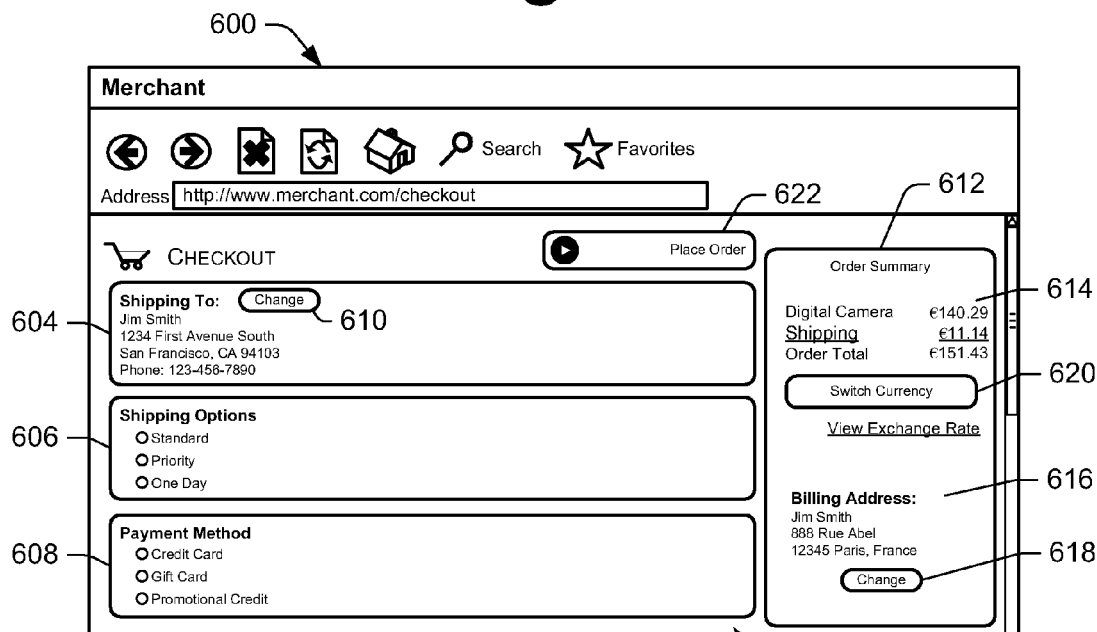
FIG. 6 illustrates a screen rendering of an exemplary checkout page encountered following successful customer logon. The checkout page illustrates an order summary having totals presented in a converted currency rather than the merchant default currency.

FIG. 6 shows a rendering 600 of an exemplary checkout page 602 encountered by a user following successful customer logon. The checkout page 602 presents information pertaining to purchase of the item in the shopping cart. This information includes, for example, the customer's shipping address 604, a set of shipping options 606, and a set of possible payment options 608. The customer may change the default shipping address 604 to another shipping address using control 610, labeled "change", juxtaposed to the "Shipping To" legend.

The checkout page 602 also includes an order summary 612 with total cost and billing details. The order summary 612 has a cost detail area 614 to present the total cost for the purchase, including the item's price and any shipping and tax. Of particular interest, note that the monetary value in this cost detail area 614 is denominated in Euros, rather than US dollars. Since this particular user preferred Euros, the currency exchange system 140 established an exchange rate and used that rate to convert the US dollars to Euros as shown in this order summary 612. These converted values in Euros are firm for a designated time period, such as a few days. Thus, these converted values are precisely what will be billed to the user, thereby eliminating any currency fluctuation risk, credit card charges for currency conversion, and bank charges for currency conversion.

Additionally, the order summary 612 has an area 616 that exhibits the default billing address of the user. A control button 618, labeled "Change", is provided in the area 616 to facilitate user change of the billing address to another address in his/her profile or to enter a new address. When a user makes any changes, the currency exchange system may decide to reevaluate the user's currency preference. For instance, the currency exchange system may have initially concluded that the user preferred having currencies presented in Euros. However, in this example, suppose the user changes the billing address 616 from France to the United States. With this change, the system may now interpret the fact that both the shipping and billing addresses are in the United States as sufficient evidence to conclude that the user's currency preference is US dollars. Thus, the system reevaluates user preference upon this change to switch automatically from a preference of Euros to a preference of US dollars. Additionally, following the reevaluation, the system may also compute a new firm currency exchange rate if the user's new preference still differs from the default currency. Alternatively, if the user's preference remains the same following reevaluation, the system may recompute or refresh the firm currency exchange rate.

A control button 620, labeled "Switch Currency", is provided beneath the cost detail area 614 of the order summary 612. The user may actuate the switch currency button 620 to switch from the displayed currency to another currency. Here, the user would be permitted to switch from Euros to another currency. Actuation of the switch currency button 620 is described further below with reference to FIG. 7. If the user is satisfied with the total costs in the displayed currency, as well as the other information shown in the checkout page 602, the user may place the order using control button 622, labeled "Place Order".

Figure 7:
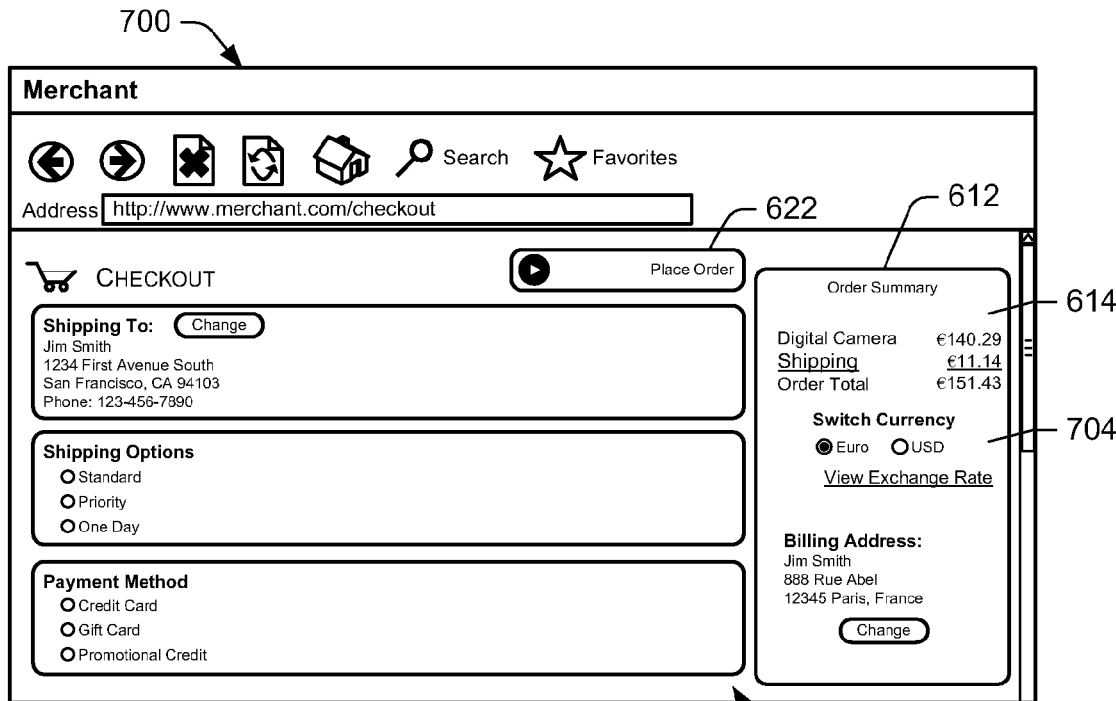
FIG. 7 illustrates a screen rendering of the exemplary checkout page of FIG. 6, but following customer election to switch currencies.

FIG. 7 shows a rendering 700 of the checkout page 602 of FIG. 6, but following customer election to switch currencies by acting on control button 620. In response, one or more user-selectable currency options 704 are presented beneath the cost detail area 614 of the order summary 612. These currency options may include the default currency of the site, as well as any other currencies that the currency exchange system 140 may discern to be of interest to the user. In this example, two currency options are provided: a first option for Euros (which is currently selected, as evidenced by the totals in area 614) and a second option for US dollars (USD). For purposes of discussion, suppose the user decides to switch currencies from Euros to US dollars by selecting the second option.

Figure 8:
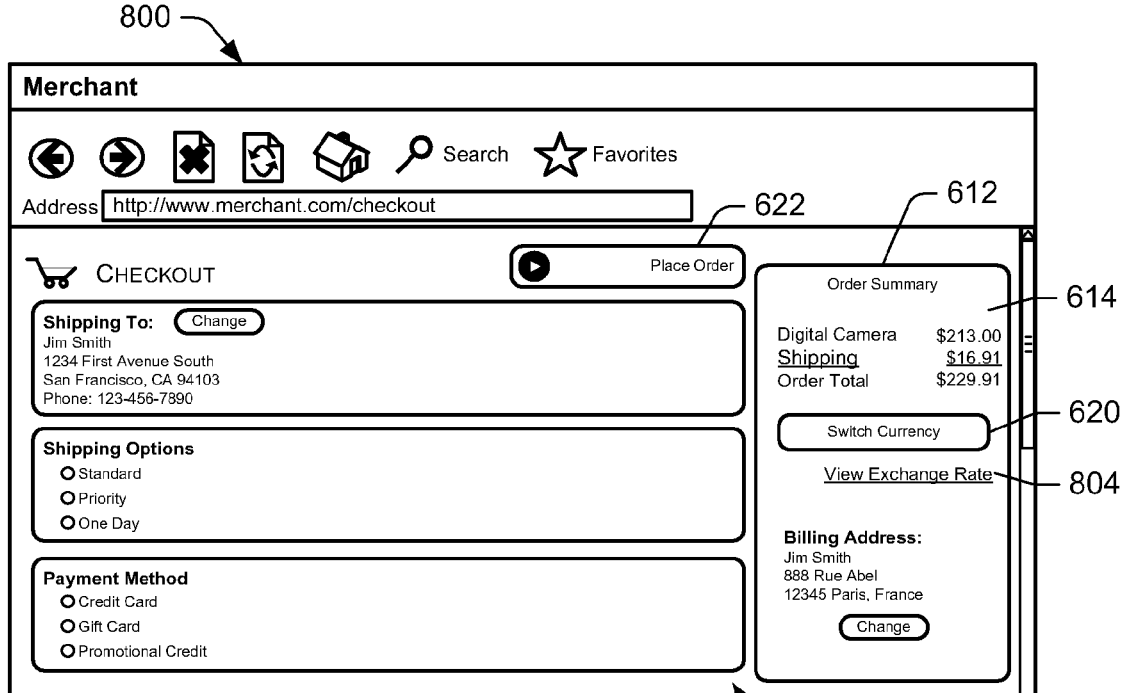
FIG. 8 illustrates a screen rendering of the exemplary checkout page of FIGS. 6 and 7, but shows the amounts in the order summary in another currency.

FIG. 8 shows a rendering 800 of the checkout page 602 of FIGS. 6 and 7, but now presents the monetary amounts in the newly chosen currency of US dollars in the cost detail area 614 of the order summary 612. Thus, a conversion has been completed from Euros to US dollars. It is noted that the user may place the order in US dollars by actuating the place order control 622. The amount shown in US dollars will be the amount billed to the client's account. The switch currency button 620 is once again provided below the cost detail area 614 to allow the user to switch back to Euros, or optionally to another currency.

Below the switch currency button 620 is a link 804 labeled "View Exchange Rate". Upon actuation of this link 804, the user can view the firm exchange rate established by the currency exchange system 140 and being offered by the site. Thus, in such an embodiment, users can make their own determination as to whether to use the proposed exchange rate in the user's local currency offered by the site, or to checkout using non-local currency and allow their bank or financial institution to perform the exchange at the bank's or financial institution's exchange rate (plus any additional fees and/or charges, if applicable).

Figure 9:
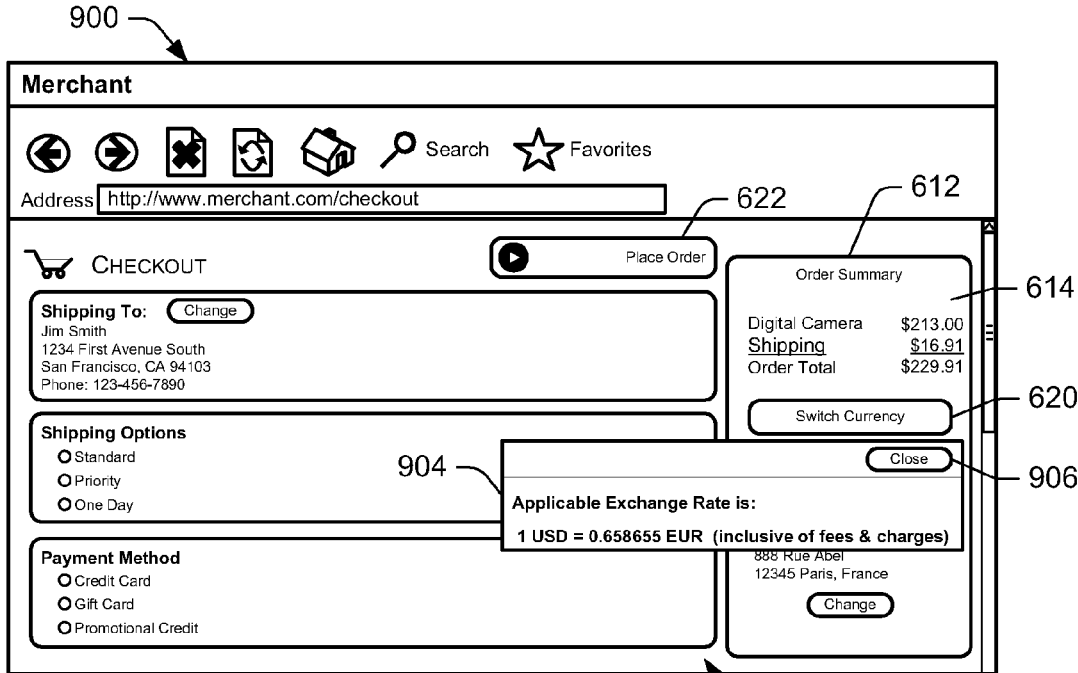
FIG. 9 illustrates a screen rendering of the exemplary checkout page of FIG. 8, but illustrates an additional pop up window with an applicable and firm exchange rate.

FIG. 9 shows a rendering 900 of the checkout page 602, but with an additional pop up box 904 overlaid on the page 602. The pop up box 904 contains the firm exchange rate being applied to convert between US dollars and Euros. In the illustrated embodiment, the rate is inclusive of all fees and charges. It is noted that the pop box 904 may be a limited function dialog box, or a full functioning window, depending upon implementation design. Further, although not shown, the box 904 may include a comparison of the firm exchange rate and the current market exchange rate for the user to review. When finished viewing the exchange rate, the user may close the box 904 by actuating a close control 906.

Following purchase of the item, the merchant may further provide an opportunity for refund. The refund period may be a set duration (e.g., 30 days, 60 days, 90 days, etc.), or it may be of indefinite duration, depending upon the business model employed by the merchant. In these cases, the merchant (or independent operator) may agree to employ the same firm currency exchange rate for the refund period (whether it be of a fixed duration or indefinite). When a refund is requested, the system retrieves the original purchase price and converts the amount using the same firm currency exchange rate used in the original purchase. In this manner, the user is refunded the exact funds originally expended to purchase the item (excepting any shipping charges or handling costs).

In the described example, the converted monetary values are provided in the electronic cart during checkout. However, as noted above, the currency exchange system 140 may supply converted monetary values for presentation for other pages of the e-commerce site that may include prices, such as on the item description pages, within search results, among many other possibilities.

Figure 10:
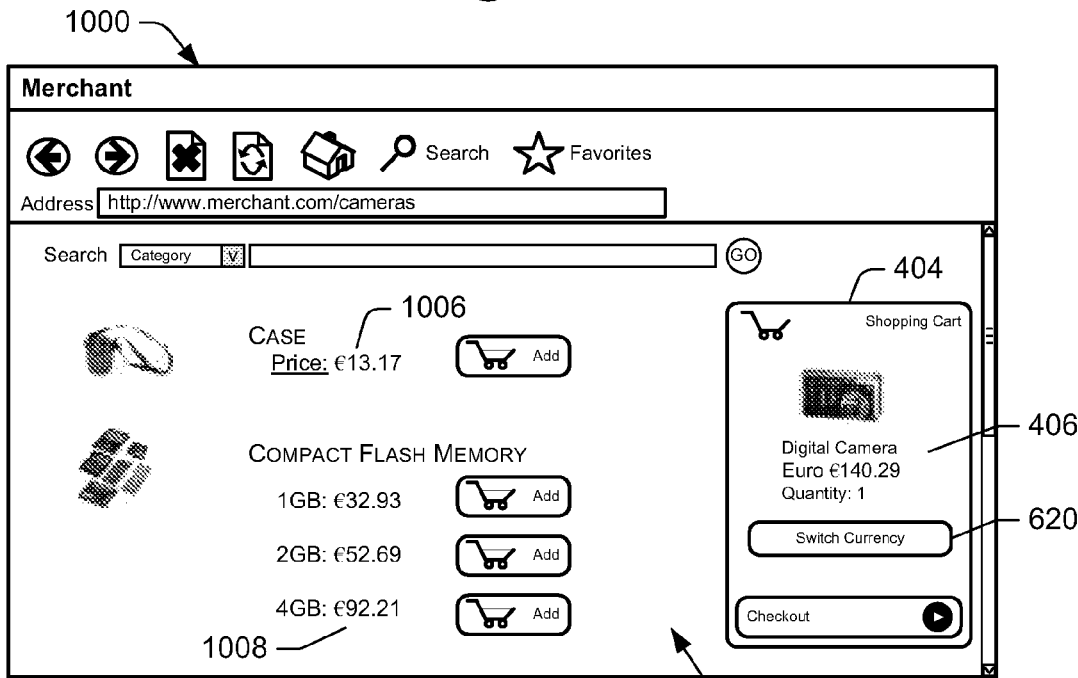
FIG. 10 illustrates a screen rendering of the exemplary page of FIG. 4, but shows the prices in the converted currency.

FIG. 10 illustrates a rendering 1000 of the page 402 of FIG. 4, but with prices provided in the converted currency of Euros, rather than US dollars. Here, the price of the digital camera item 406 is shown in Euros, as are the prices 1006 and 1008 of the camera case and memory, respectively. In this implementation, the currency exchange system 140 discerns the user preferences from the user profile and history (if the user has logged on to the site) or from other indicia such as the user's point of access. The user's point of access can be determined by associating IP addresses with likely geographic locations, determining the physical location of an access point (e.g. wi-fi hot spot) being used by the user, reporting from a global positioning system (GPS) associated with the user's client device, among many other possibilities. Accordingly, if it is determined that the user is likely to be accessing the site from a location in Europe, the currency exchange system 140 employs this evidence to establish a firm exchange rate to convert the prices from the site's default currency (e.g., US dollars) to the inferred currency of preference (e.g., Euros). At any time, the user may elect to switch currencies. It is noted that, in the situation where the user is merely browsing and has not begun any checkout processes, the duration for which the site may be willing to guarantee the currency exchange may be shorter. In one embodiment, the time period extends only during the session. Once the user leaves the site, the currency exchange rate is no longer guaranteed.

Further, as noted above, the currency exchange system 140 may supply converted monetary values in other contexts outside of e-commerce. More generally, the currency exchange system 140 may provide converted monetary values for essentially any online application where the user may wish to enter into a transaction and hence would be interested in knowing a firm value. Other examples where firm currency conversion may be implemented include contract terms, advertisement prices, stock purchases, bill payment, banking, and so on.

Operation

FIG. 11 illustrates an example process 1100 for intelligently converting and offering a firm currency exchange rate for an online transaction. The process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the process 1100 is described with reference to the architecture 100 of FIG. 1 and the computing system 200 of FIG. 2. In particular, many acts described below may be implemented and performed by the currency exchange system 140 shown in FIGS. 1 and 2. Additional reference may be made to any of the UI renderings in FIGS. 3-10.

At 1102, a user's currency preference is ascertained. This operation may be performed, for example, by the customer preference module 230 shown in FIG. 1. The customer preference may be discerned in many ways. In one approach, the user may explicitly provide this preference during the online session. In another approach, this preference may be expressly stipulated in a user profile or assumed from other data kept in the user profile, such as billing or shipping information, or other information that might reveal a geographical location. In yet another approach, the currency preference maybe inferred from user behavior or purchase history.

At 1104, it is determined whether the user's preferred currency is the same as the default currency employed at the site. If the preferred and default currencies are the same (i.e., the "Yes" branch from act 1104), the monetary amounts are presented to the user in the default currency at 1106. At 1108, the process determines whether the user places an order. If not (i.e., the "No" branch from act 1108), the session continues with monetary values being presented in the default currency. Conversely, if the user decides to place an order (i.e., the "Yes" branch from act 1108), the transaction is completed using the monetary totals presented to the user at 1110. The user's account will be billed the amount shown in the default currency.

With reference again to 1104, if the user's currency preference is different than the default currency (i.e., the "No" branch from act 1104), a firm exchange rate is established to convert the default currency to the user's preferred currency at 1112. In one implementation, this operation is performed by the currency rate determiner 232. As part of this operation, the currency rate determiner 232 interacts with a financial institution 150 to obtain a market exchange rate. The site operator and/or administrator of the currency exchange system 140 may be engaged in a contractual relationship with the financial institution 150 to purchase currencies at the rate provided by the institution 150. The firm exchange rate may differ from the market exchange rate since the site operator is willing to assume risks related to currency fluctuations until the transaction is completed and settled.

At 1114, the firm exchange rate is guaranteed for the user for a transaction period. This period may vary, depending upon the implementation context as well as the circumstances surrounding the transaction. Further, the length of time for which the exchange rate will be guaranteed may play a role in determining the firm exchange rate. In one implementation involving the sale of items from an electronic merchant site, the transaction period may be based on a delivery timeframe of the item. For shorter delivery timeframes, the site operator may be willing to offer a firm exchange rate that is close to the market exchange rate because the risk of currency fluctuations may be minimal. As delivery timeframes grow longer, however, the site operator may provide a firm exchange rate at more favorable terms than that provided by the market exchange rate in order to hedge some of the risk. This operation 1114 may be performed, for example, by the rate risk assessor 234 of FIG. 2.

At 1116, monetary values are converted from the default currency to the user's preferred currency using the firm exchange rate. In the e-commerce context, the monetary values may be part of a checkout process, or provided as part of a shopping experience. In other contexts, the monetary values may be any supplied for any situation where the user may wish to engage in a transaction involving the monetary values.

At 1118, the converted amounts are presented to the user in the user's preferred currency. This presentation may be in the form of a page of content served to and rendered on the user computing device.

At 1120, the process determines whether the user places an order. If not (i.e., the "No" branch from act 1120), the session continues with monetary values being presented in the user's preferred currency at 1118. Conversely, if the user decides to place an order (i.e., the "Yes" branch from act 1120), the transaction is completed at 1122 using the converted amounts in the user's preferred currency. Thus, the amount billed to the user is the same as that presented during the transaction. In this manner, the customer's exposure to any surcharges applied by a financial institution or by the customer's bank are effectively reduced or eliminated entirely because the user is billed in his/her home currency.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A server system comprising:
   one or more processors;
   memory accessible by the one or more processors;
   a currency exchange system stored in the memory and executable on the one or more processors to ascertain a currency preferred by a user and to convert monetary values from a default currency to the currency preferred by the user, the currency exchange system using an exchange rate that is based, at least partly, on a market exchange rate and a term for which the exchange rate is valid; and
   a shipping module stored in the memory and executable on the one or more processors to maintain various shipping options for selection by the user that define delivery timeframes within which items being offered for sale are to be delivered to the user, wherein the currency exchange system determines the term for which the exchange rate is valid based, at least in part, on the user selected shipping option.

2. A server system as recited in claim 1, further comprising a database of at least one of user profiles or purchase history, wherein the currency exchange system evaluates said at least one of user profiles or purchase history to ascertain the currency preferred by the user.

3. A server system as recited in claim 1, wherein the term is greater than 24 hours and less than fourteen days.

4. A server system as recited in claim 1, wherein the currency exchange system requests the market exchange rate from an independent financial institution.

5. A server system as recited in claim 1, wherein the currency exchange system provides one or more amounts in the currency preferred by the user while the user shops at an electronic merchant site.

6. A server system as recited in claim 1, wherein the exchange rate is further used to determine a refund amount in an event that a sale of the item is canceled.

7. A server system as recited in claim 1, further comprising a checkout module stored in the memory and executable on the one or more processors to facilitate checkout during an electronic commerce transaction, the checkout module presenting one or more amounts in the currency preferred by the user in a checkout page.

8. A method for facilitating electronic commerce transactions over a network, the method comprising:
one or more computer systems configured with executable instructions for performing acts of:
ascertaining a currency that is preferred by a purchaser involved in an electronic commerce transaction, the electronic commerce transaction involving a purchase of an item to be delivered;
determining a delivery timeframe for delivery of the item based on a user selected shipping option for the item;
establishing a firm currency exchange rate to be used for a period of time based, at least in part, on the shipping option;
converting one or more amounts in the electronic commerce transaction from the default currency to the currency preferred by the purchaser according to the firm currency exchange rate;
presenting, to the purchaser, the one or more amounts in the currency preferred by the purchaser prior to completion of the electronic commerce transaction; and
upon approval of the electronic commerce transaction within the period of time, using the firm currency exchange rate to complete the electronic commerce transaction.

9. A method as recited in claim 8, wherein the period of time is greater than 24 hours.

10. A method as recited in claim 8, wherein the ascertaining comprises evaluating a purchase history of the purchaser.

11. A method as recited in claim 8, wherein the ascertaining comprises evaluating at least one of a user profile of the purchaser, a shipping address of the purchaser, a billing address of the purchaser, or a point of access onto the network.

12. A method as recited in claim 8, wherein the electronic commerce transaction involves purchase of the item from a merchant site having a checkout process, and the presenting comprises placing the one or more amounts in the currency preferred by the purchaser in a checkout page to be served to the purchaser when purchasing the item.

13. A method as recited in claim 8, wherein the purchaser is shopping at an electronic merchant site having multiple items, wherein the converting and presenting comprise converting prices of the items from the default currency to the currency preferred by the purchaser according to the firm currency exchange rate and presenting the converted prices while the purchaser shops on the electronic merchant site.

14. A method as recited in claim 8, further comprising employing the firm currency exchange rate to determine a refund amount in an event that the electronic commerce transaction is canceled.

* * * * *